Patented Mar. 11, 1947

2,417,404

UNITED STATES PATENT OFFICE 2,417,404

RESINOUS COPOLYMER OF A DIACYLATE OF AN UNSATURATED ALDEHYDE

Louis M. Minsk and Cornelius C. Unruh, Rochester, N. Y., assignors to Eastman Kodak Company, Rochester, N. Y., a corporation of New Jersey No Drawing. Application May 25, 1943, Serial No. 488,398

10 Claims. (Cl. 260—84)

This invention relates to resinous copolymers and more particularly to resinous copolymers of diacylates of unsaturated aldehydes containing an aliphatic carbon-to-carbon double bond with homopolymerizable unsaturated organic compounds.

Acrolein diacetate can be prepared by the action of acetic anhydride on acrolein, Wohl and Maag, Ber. 43, 3293 (1910). Higher acrolein diacylates as well as α-methacrolein and α-ethacrolein diacylates have also been prepared (see the copending application of Joseph H. Brant and Frederick R. Conklin, Serial No. 485,346, filed May 1, 1943, now U. S. Patent 2,393,740, dated Jan. 29, 1946). Diacylates of other unsaturated aldehydes, such as crotonaldehyde and cinnamaldehyde, have also been prepared (Monatsh. 30, 847 and 855). Attempts to homopolymerize these diacylates by heating with known organic peroxide polymerization catalysts have failed in all cases.

We have now found, however, that diacylates of unsaturated aldehydes containing an aliphatic carbon-to-carbon double bond copolymerize with homopolymerizable unsaturated organic compounds to give useful resinous copolymers. (The term "aliphatic carbon-to-carbon double bond" is employed to contrast with the double bonds found in the aromatic benzene nucleus.)

It is, accordingly, an object of our invention to provide new resinous copolymers. A further object is to provide a process for preparing such resinous copolymers. Other objects will become apparent hereinafter.

In accordance with the invention, we copolymerize a diacylate of an unsaturated aldehyde containing an aliphatic carbon-to-carbon double bond with another unsaturated organic compound which itself undergoes polymerization, i. e. homopolymerizes. Exemplary of such unsaturated organic compounds are those containing a $CH_2=C<$ group such as the following: vinyl carboxylic esters (e. g. vinyl acetate) vinyl halides, vinyl ethers, acrylonitrile, α-methacrylonitrile, unsaturated organic compounds containing a carbon-to-carbon double bond conjugated with another carbon-to-carbon double bond (e. g. styrene) and unsaturated organic compounds containing a carbon-to-carbon double bond conjugated with a carbon-to-oxygen double bond (e. g. acrylic acid, acrylic esters, α-alkylacrylic acids, α-alkylacrylic esters, α-chloroacrylic acid, α-chloroacrylic esters and α-cyanoacrylic esters).

Exemplary of the diacylates of unsaturated aldehydes containing an aliphatic carbon-to-carbon double bond are the following: acrolein diacetate, α-methacrolein diacetate, α-ethacrolein diacetate, α-methacrolein dipropionate, α-methacrolein dibutyrate, α-methacrolein dibenzoate, α-bromacrolein diacetate, α-chlorocrotonaldehyde diacetate, crotonaldehyde diacetate and cinnamaldehyde diacetate.

The copolymerizations are accelerated by heat and by polymerization catalysts known to accelerate the polymerization of polymerizable vinyl and acrylic compounds. Exemplary of such catalysts are: organic peroxides (e. g. benzoyl peroxide, acetyl benzoyl peroxide and lauroyl peroxide), hydrogen peroxide, perborates (e. g. sodium perborate) and persulfates (e. g. sodium persulfate).

The copolymerizations can be effected in the presence or in the absence of a diluent. The diluent is advantageously one in which the copolymers are soluble. The copolymerizations can also be effected by emulsifying the monomers in a liquid in which the monomers are insoluble (e. g. water) and then subjecting the emulsion to polymerization.

The following examples will serve to illustrate our new copolymers and the manner of obtaining the same.

*Example 1—Copolymer of acrolein diacetate and methyl α-methacrylate*

15.8 g. of acrolein diacetate, 20 g. of methyl α-methacrylate and 0.179 g. of benzoyl peroxide were sealed in a glass tube. The sealed tube was heated in a steam bath at 100° C. for 54 hours. At the end of this time the materials in the tube had copolymerized to give a solid, clear copolymer. The tube was opened and the copolymer dissolved in acetone, with shaking. The copolymer was precipitated by pouring the acetone solution into a liter of absolute ethyl alcohol. The precipitated copolymer was freed from excess monomers by extracting three times with one liter portions of fresh absolute alcohol, allowing one hour soaking during each extraction. The extracted copolymer was then dried in a vacuum desiccator over calcium chloride. Yield 18.6 g. The acetyl content of the copolymer was 5.2 percent by weight, equivalent to 9.55 percent of acrolein diacetate in the copolymer.

*Example 2.—Copolymer of α-methacrolein diacetate and methyl acrylate*

17.2 g. of α-methacrolein diacetate, 8.6 g. of methyl acrylate and 0.13 g. of benzoyl peroxide were sealed in a glass tube. The sealed tube was heated for eight days in a water bath at 50° C. The tube was opened and the solid copolymer dissolved in 200 cc. of acetone with shaking. The resulting solution was poured into one liter of absolute ethyl alcohol to precipitate the copolymer. The precipitated copolymer was extracted with several changes of absolute ethyl alcohol. The precipitated copolymer was again dissolved in 200 cc. of acetone and the solution again poured into one liter of absolute ethyl alcohol to reprecipitate the copolymer. The reprecipitated copolymer was extracted with several changes of absolute ethyl alcohol. The precipitated copolymer was dried over phosphorous pentoxide at atmospheric pressure. The copolymer contained 19.5 percent by weight of acetyl, equivalent to 39 percent α-methacrolein diacetate in the copolymer.

*Example 3.—Copolymer of α-methacrolein diacetate and methyl α-methacrylate*

17.2 g. of α-methacrolein diacetate, 10 g. of methyl α-methacrylate and 0.13 g. of benzoyl peroxide were sealed in a glass tube and treated as in Example 2. The purified copolymer contained 8.8 percent by weight of acetyl, equivalent to 17.6 percent of α-methacrolein diacetate in the copolymer.

*Example 4.—Copolymer of α-ethacrolein diacetate and methyl acrylate*

30 g. of methylacrylate, 10 g. of α-ethacrolein diacetate and 0.08 g. of benzoyl peroxide were sealed in a glass tube. The sealed tube was heated at 100° C. in a steam bath. After 39 hours of heating, the contents of the tube had changed to a viscous mass which showed practically no flow when cold. The tube was broken and the contents were dissolved in 200 cc. of acetone. The copolymer was precipitated by pouring the acetone solution into 1½ liters of absolute ethyl alcohol. The precipitated copolymer was washed with absolute ethyl alcohol and again dissolved in 200 cc. of acetone from which the copolymer was again precipitated by pouring the solution into 1½ liters of absolute ethyl alcohol. The precipitated copolymer was again washed with absolute ethyl alcohol and dried at 55° C. in a Majonnier oven under a vacuum of 20 inches of mercury. 21 g. of clear, tough, rather soft copolymer were obtained. The copolymer contained 4.9 percent by weight of acetyl, corresponding to 10.6 percent of α-ethacrolein diacetate in the copolymer.

*Example 5.—Copolymer of crotonaldehyde diacetate and styrene*

17.2 g. of crotonaldehyde diacetate, 20.8 g. of styrene and 0.19 g. of benzoyl peroxide were sealed in a glass tube. The sealed tube was heated in a steam bath at 100° C. for 54 hours. The copolymer was broken from the tube and dissolved in 100 cc. of 1,4-dioxane, with shaking. The resulting solution was then poured into one liter of absolute ethyl alcohol to precipitate the copolymer. The precipitated copolymer was extracted with three one-liter portions of absolute ethyl alcohol, allowing one hour, at least, for each extraction, to remove excess monomers. The copolymer was then dried, in vacuo, over calcium chloride. The yield was 18 g. The copolymer contained an acetyl content of 1.35 percent by weight, equivalent to 2.7 percent of crotonaldehyde diacetate in the copolymer.

*Example 6.—Copolymer of cinnamaldehyde diacetate and methyl acrylate*

16 g. of methyl acrylate, 4 g. of cinnamaldehyde diacetate and 0.04 g. of benzoyl peroxide were sealed in a glass tube. The sealed tube was heated in a steam bath at 100° C. for 66 hours. The contents of the tube were of such high viscosity that flow did not occur when the tube was inverted. The contents were broken from the tube and dissolved in 200 cc. of acetone, with shaking. The resulting solution was poured into one liter of absolute ethyl alcohol to precipitate the copolymer. The precipitated copolymer was extracted with several changes of absolute ethyl alcohol, allowing at least two hours soaking for each extraction, to remove excess monomers. The precipitated copolymer was then dried first in vacuo over calcium chloride at ordinary room temperature and then in vacuo at 55° C. Yield 11½ g. The copolymer contained 1.38 per cent by weight acetyl, equivalent to 3.75 per cent of cinnamaldehyde diacetate in the copolymer.

*Example 7.—Copolymer of α-methacrolein dipropionate and vinyl acetate*

α-Methacrolein dipropionate, vinyl acetate and benzoyl peroxide, in the amounts given in the accompanying table, were sealed in glass tubes and the sealed tubes were heated at 50° C. in a water bath. When polymerization had occurred, the copolymers were broken from the tubes and dissolved in acetone. The acetone solutions were poured into boiling distilled water to precipitate the copolymers. Steam was then passed through the suspension of copolymer in water to remove unreacted monomers and acetone. The copolymers were then dried in an air oven at 50° C.

| α-Methacrolein dipropionate | Vinyl acetate | Benzoyl peroxide | Polymerization time | Yield of copolymer | Weight per cent of α-methacrolein dipropionate in copolymer |
|---|---|---|---|---|---|
| *Grams* | *Grams* | *Grams* | *Days* | *Grams* | |
| 0.625 | 24.38 | 0.25 | 10 | ---------- | 2.46 |
| 1.75 | 23.25 | 0.25 | 10 | ---------- | 7.2 |
| 2.5 | 22.5 | 0.25 | 10 | ---------- | 10.5 |
| 5.0 | 20.0 | 0.25 | 10 | ---------- | 20.2 |
| 4.0 | 16.0 | 0.04 | 8 | 19.6 | [1] 20.05 |
| 6.0 | 14.0 | 0.04 | 8 | 16.1 | 32.4 |
| 8.0 | 12.0 | 0.04 | 10 | 16.0 | 47.2 |
| 10.0 | 10.0 | 0.04 | 14 | 17.0 | [2] 49.4 |
| 12.0 | 8.0 | 0.04 | 20 | 12.5 | 67.1 |

[1] This copolymer was further purified before analysis by twice reprecipitating it in diethyl ether from acetone solution, washing each precipitate with fresh diethyl ether, and then drying first in an air oven at 50° C. and next for 3 days in a vacuum oven at 50° C.
[2] This copolymer was further purified before analysis by twice reprecipitating it in Skellysolve G from acetone solution, washing each precipitate with fresh Skellysolve G, and then drying first in an air oven at 50° C. and next for 3 days in a vacuum oven at 50° C.

*Example 8.—Copolymer of α-methacrolein dipropionate and methyl α-methacrylate*

Various mixtures of α-methacrolein dipropionate and methyl α-methacrylate each totaling 20 g. together with 0.04 g. of benzoyl peroxide were sealed in glass tubes. The tubes were heated at 50° C. in a water bath until solid copolymers were obtained. The tubes were opened and the copolymers dissolved in acetone. The acetone solutions were poured into absolute ethyl alcohol, using one liter of alcohol for each 200 cc. of solution. The precipitated copolymers were freed from excess monomers by extraction with absolute ethyl alcohol and dried in vacuo over calcium chloride. The pertinent data are given in the following table.

| Weight per cent α-methacrolein dipropionate in mixture of monomers | Polymerization time, hours | Acetone to dissolve copolymer, cc. | Yield of copolymer, grams | Weight per cent propionyl in copolymer | Weight per cent α-methacrolein dipropionate in copolymer |
|---|---|---|---|---|---|
| 10 | 114 | 320 | 18.1 | 0.54 | 0.95 |
| 20 | 114 | 320 | 17.9 | 1.43 | 2.5 |
| 30 | 114 | 320 | 12.2 | 2.6 | 4.6 |
| 40 | 114 | 320 | 12.2 | 3.7 | 6.5 |
| 50 | 114 | 320 | 10.6 | 4.4 | 7.7 |
| 60 | 114 | 170 | 8.9 | 6.0 | 10.5 |
| 70 | 114 | 120 | 6.2 | 7.7 | 13.5 |

*Example 9.—Copolymer of α-methacrolein dibutyrate and vinyl acetate*

22.8 g. of α-methacrolein dibutyrate, 17.2 g. of vinyl acetate and 0.2 g. of benzoyl peroxide were sealed in a glass tube. The sealed tube was heated in a steam bath at 100° C. After six days, the tube was opened and the moderately viscous contents were dissolved in acetone (50 cc.). The resulting solution was poured into hot distilled water to precipitate the copolymer. The precipitated copolymer was steamed until all odor of monomer and acetone had disappeared. The copolymer was dried in vacuo over calcium chloride. Yield 21 g. The copolymer contained 65.2 percent by weight of α-methacrolein dibutyrate.

*Example 10.—Copolymer of α-methacrolein dibutyrate and methyl α-methacrylate*

22.8 g. of α-methacrolein dibutyrate, 20 g. of methyl α-methacrylate and 0.214 g. of benzoyl peroxide were sealed in a glass tube and the sealed tube was heated in a steam bath at 100° C. for 54 hours. The copolymer obtained had slight hot flow but no obvious cold flow. The copolymer was broken from the tube and dispersed in 150 cc. of acetone with shaking. The solution was poured into one liter of absolute ethyl alcohol to precipitate the copolymer. The precipitated copolymer was extracted with three one-liter portions of absolute ethyl alcohol, allowing at least one hour soaking for each extraction. The copolymer was dried in vacuo over calcium chloride. Yield 17.4 g. The copolymer contained 1.8 percent of butyryl, equivalent to 2.9 percent of α-methacrolein dibutyrate.

*Example 11.—Copolymer of α-methacrolein dibenzoate and vinyl acetate*

10 g. of α-methacrolein dibenzoate, 40 g. of vinyl acetate and 0.5 g. of benzoyl peroxide were heated at 50° C. in an all-glass apparatus equipped with a reflux condenser, in a water bath. After nine days, the contents of the reaction flask had changed to a rubbery mass. This mass was dissolved in 250 cc. of acetone, with shaking. The solution was poured into two liters of diethyl ether to precipitate the copolymer. The precipitated copolymer was extracted with several changes of diethyl ether and then redissolved in acetone (250 cc.). The solution was again poured into two liters of diethyl ether and the precipitated copolymer again extracted with diethyl ether. The copolymer was again dissolved in acetone and the solution poured into boiling distilled water to precipitate the copolymer. Steam was passed through the aqueous suspension of the precipitated copolymer for one hour. The precipitated copolymer was then dried at 55° C. in a vacuum oven. 24 g. of a clear brown brittle copolymer were obtained. A sample of the copolymer was saponified with 10 per cent aqueous sodium hydroxide and a substantial amount of benzoic acid was isolated, proving that the copolymer contained α-methacrolein dibenzoate. The copolymer contained 58.32 per cent by weight of carbon and 6.72 per cent by weight of hydrogen, corresponding to 15 per cent of α-methacrolein dibenzoate in the copolymer.

*Example 12.—Copolymer of crotonaldehyde dipropionate and vinyl acetate*

250 g. of mixtures of vinyl acetate and crotonaldehyde dipropionate, containing 2½, 5 and 10 per cent by weight of crotonaldehyde dipropionate were treated in tightly stoppered brown bottles with 0.1 per cent by weight of benzoyl peroxide. The bottles were then heated in a water bath at 50° C. When the mixtures of liquid monomers had set to a solid mass, the contents of the bottles were dissolved in acetone and the solution poured into hot distilled water to precipitate the copolymers. To remove unreacted monomers and solvent, steam was passed through the suspension of copolymer in the water for four hours. The copolymers was then dried at 50° C. in an air cabinet. The results of these copolymerizations are tabulated in the following table:

| Crotonylidene dipropionate | Vinyl acetate | Benzoyl peroxide | Polymerization time | Yield of copolymer | Weight per cent of crotonylidene dipropionate in copolymer |
|---|---|---|---|---|---|
| Grams | Grams | Grams | Days | Grams | |
| 6.24 | 243.75 | 0.25 | 4 | 210 | 2.9 |
| 12.5 | 237.5 | 0.25 | 5 | 186 | 4.2 |
| 25.0 | 225.0 | 0.25 | 11 | 220 | 8.4 |

*Example 13.—Copolymer of α-bromacrolein diacetate and methyl α-methacrylate*

16 g. of methyl α-methacrylate, 4 g. of α-bromacrolein diacetate and 0.04 g. of benzoyl peroxide were sealed in a glass tube and heated at 50° C. in a constant temperature bath. After 41 hours, a clear solid polymer was obtained. This was dispersed in 300 cc. of acetone, with shaking. The acetone solution was poured into 1½ liters of absolute ethyl alcohol to precipitate the copolymer. The precipitated copolymer was extracted free from monomers with absolute ethyl alcohol and then dried in vacuo over calcium chloride. The copolymer contained 2.07 percent by weight of bromine, equivalent to 6.14 percent of α-bromacrolein diacetate in the copolymer.

*Example 14.—Copolymer of α-bromacrolein diacetate and styrene*

16 g. of styrene, 4 g. of α-bromacrolein diacetate and 0.04 g. of benzoyl peroxide were sealed in a glass tube and the tube heated at 50° C. in a constant temperature bath for eleven days. The copolymer was broken from the tube and dispersed in 250 cc. of 1,4-dioxane with shaking. The dioxane solution was then poured into one liter of absolute ethyl alcohol to precipitate the copolymer. The precipitated copolymer was freed from monomers by extraction with absolute ethyl alcohol. The copolymer was then dried over calcium chloride in vacuo. Yield 11 g. The copolymer contained 2.59 percent by weight of bromine, equivalent to 7.3 percent of α-bromacrolein diacetate in the copolymer.

*Example 15.—Copolymer of α-bromacrolein diacetate and vinyl acetate*

97 g. of vinyl acetate, 3 g. of α-bromacrolein diacetate and 0.1 g. of benzoyl peroxide were heated in a water bath at 50° C. for ten days in a tightly stoppered brown bottle. A tough copolymer was obtained which swelled in acetone. This was suspended in distilled water and steam passed through the suspension for four hours to remove monomers. The copolymer was then dried at 50° C. Yield 36 g. The copolymer contained 2.1 percent by weight of bromine, equivalent to 6.24 percent of α-bromacrolein diacetate in the copolymer.

*Example 16.—Copolymer of α-chlorocrotonaldehyde diacetate and vinyl acetate*

195 g. of vinyl acetate, 5 g. of α-chlorocrotonaldehyde diacetate and 0.2 g. of benzoyl peroxide were heated in a tightly stoppered brown bottle in a water bath maintained at 50° C. After four days, the contents of the bottle showed an increase in viscosity and after seven days had set to a solid mass of copolymer. The solid mass was dissolved in one liter of acetone. The acetone solution was poured into 10 liters of boiling distilled water. Steam was passed through the water containing the suspended copolymer for four hours to remove excess monomers and acetone. The copolymer was then dried at 50° C. for 48 hours. Yield 161 g. The copolymer contained 0.31 percent by weight of chlorine, corresponding to 1.8 percent of α-chlorocrotonaldehyde diacetate in the copolymer.

*Example 17.—Copolymerization of α-methacrolein dipropionate and vinyl acetate in ethyl acetate*

To 100 cc. of ethyl acetate were added 15 g. of α-methacrolein dipropionate, 35 g. of vinyl acetate and 0.15 g. of benzoyl peroxide. The mixture was placed on a steam bath in an all-glass apparatus equipped with a reflux condenser, the contents of the apparatus being protected from moisture by means of a calcium chloride tube. After 42 hours of heating, a clear, rather thin solution was obtained. The copolymer was precipitated from this solution by pouring the solution into two liters of Skellysolve G (low boiling hydrocarbon, B. P. 50 to 70° C.). The soft precipitated copolymer was washed with fresh Skellysolve and redissolved in 200 cc. of acetone. The copolymer was again precipitated by pouring the acetone solution into two liters of Skellysolve. The precipitated copolymer was extracted with two liters of fresh Skellysolve and dried at 50° C. first in an air oven and then in a Majonnier oven under a vacuum of 25 inches of mercury. The yield was 24 g. This copolymer contained 36 per cent by weight of α-methacrolein dipropionate.

*Example 18.—Copolymerization of acrolein diacetate and methyl α-methacrylate in ethyl acetate*

To 100 cc. of ethyl acetate were added 15 g. of acrolein diacetate, 35 g. of methyl α-methacrylate and 0.15 g. of benzoyl peroxide. This mixture was placed in an all-glass apparatus equipped with a reflux condenser, the contents of the apparatus being protected from moisture by a calcium chloride tube. The apparatus was heated on a steam bath for 42 hours, whereupon a clear solution of moderate viscosity was obtained. This solution was diluted with 200 cc. of acetone and then poured into two liters of absolute ethyl alcohol to precipitate the copolymer. The friable precipitate was filtered off, washed with absolute ethyl alcohol and redissolved in 400 cc. of acetone. The copolymer was again precipitated by pouring the acetone solution into two liters of absolute ethyl alcohol and, after washing with absolute ethyl alcohol, was dried at 50° C. The yield was 32 g. Analysis on a sample which was further dried for 72 hours at 50° C. in a Majonnier oven under a vacuum of 25 inches of mercury showed an acetyl content of 1.35 percent by weight, corresponding to 2.49 percent of acrolein diacetate in the copolymer.

*Example 19.—Copolymerization of acrolein diacetate and styrene in emulsion*

180 g. of styrene and 20 g. of acrolein diacetate were added to a solution of 800 cc. of distilled water, 2 g. of sodium lauryl sulfonate (Orvus WA) and 1 cc. of 30 percent hydrogen peroxide. The mixture was heated on a steam bath in an all-glass apparatus equipped with a reflux condenser, while a gentle stream of nitrogen was passed through the apparatus. After 24 hours, heating was stopped and the resulting latex was filtered to remove solid material. The colloid was then broken by adding to it a concentrated solution of Calgon (sodium hexameta phosphate). The copolymer, all of which precipitated in a finely divided form, was filtered onto a Buchner funnel. The copolymer was then stirred with three changes of distilled water, each of three liters, filtering onto a Buchner funnel each time, and finally with two liters of absolute ethyl alcohol. The washed copolymer was dried at 50° C. The yield, exclusive of the copolymer lost during filtering, was 137 g. The analysis of this copolymer, after further purification by precipitation from dioxane-benzene solution into absolute ethyl alcohol and redrying, was as follows: carbon 91.15 percent, hydrogen 7.59 percent, leaving an oxygen content of 1.3 percent, corresponding to 3.11 percent of acrolein diacetate in the copolymer.

*Example 20.—Copolymerization of α-ethacrolein diacetate and styrene in emulsion*

180 g. of styrene and 20 g. of α-ethacrolein diacetate were added to a solution of 800 cc. of distilled water containing 2 g. of sodium lauryl sulfonate (Orvus WA) and 1 cc. of 30 percent hydrogen peroxide. This mixture was heated on a steam bath in an all-glass apparatus equipped with a reflux condenser while a gentle stream of nitrogen was passed through the apparatus. After 24 hours of heating, the resulting latex was filtered to remove a small amount of solid material. The colloid was then broken by adding to it a strong solution of sodium hexametaphosphate. The copolymer which precipitated in a finely divided form was then filtered onto a Buchner funnel. The precipitated copolymer was stirred with three changes of two-liter portions of distilled water, filtered onto a Buchner funnel each time, and finally with two liters of absolute ethyl alcohol. The precipitated copolymer was dried at 50° C. The yield, exclusive of copolymer lost when the latex was filtered, was 153 g. Analysis of the copolymer after further purification by two precipitations from dioxane solution into absolute ethyl alcohol was as follows: carbon 90.95 percent, hydrogen 7.72 percent, leaving an oxygen content of 1.33 percent corresponding to 3.87 percent of α-ethacrolein diacetate in the copolymer.

The monomeric diacylates employed herein were prepared in accordance with known procedures by the action of an excess of the appropriate acid anhydride upon the unsaturated aldehyde, in the presence of a few drops of sulfuric acid. The diacylates were isolated from the resulting reaction mixtures by one of three methods, viz.:

A. Water extraction of the mixture with the destruction of excess acid anhydride and removal of the resulting water soluble acid. The residue was then dried and distilled.
B. Alkali extraction to remove acid anhydride, used specifically in the case of α-methacrolein dibenzoate, since benzoic anhydride shows considerable stability to water.
C. Destruction of the sulfuric acid by double decomposition with the sodium salt of the organic acid, whose anhydride was used, followed by distillation.

The method of isolation, the analysis and a characteristic physical constant of the diacylates prepared and used herein are given in the following table:

|  | Method of isolation | B. P. or M. P. | Analysis | | | |
|---|---|---|---|---|---|---|
|  |  |  | Found | | Calc. | |
|  |  |  | C | H | C | H |
| Acrolein diacetate | C | 94–6/29 mm | 53.59 | 6.57 | 53.2 | 6.33 |
| α-Methacrolein diacetate |  | 85.5–86.5/11 mm |  |  |  |  |
| α-Ethacrolein diacetate | C | 108–9/30 mm | 58.18 | 7.63 | 58.1 | 7.53 |
| α-Methacrolein dipropionate | C | 103–4.5/13 mm | 60.66 | 7.78 | 60.3 | 7.54 |
| α-Methacrolein dibutyrate | C | 143–6/28 mm | 63.32 | 8.95 | 63.2 | 8.78 |
| α-Methacrolein dibenzoate | B | Heavy viscous oil. Attempts to purify by crystallization or distillation not successful. | | | | |
| α-Bromoacrolein diacetate | C | 113–16/9 mm (Br, found 33.95, calc. 33.76). | | | | |
| α-Chlorocrotonaldehyde diacetate | A | 126–9/23 mm |  |  |  |  |
| α-Crotonaldehyde diacetate | C | 100–1/16.5 mm | 56.20 | 6.88 | 55.8 | 6.98 |
| Cinnamaldehyde diacetate | C | MP 85–86 |  |  |  |  |

Our new resinous copolymers can be molded by the usual compression or injection methods, with or without plasticizers to give sheets, rods, tubes or other shaped objects. Our new resinous copolymers can also be used as the resinous component of lacquers.

What we claim as our invention and desire to be secured by Letters Patent of the United States is:

1. A process for preparing a resinous copolymer comprising heating, in the presence of a polymerization catalyst, a mixture of a compound selected from the group consisting of vinyl acetate, methyl acrylate, methyl α-methacrylate and styrene, with a diacylate of a monocarboxylic acid selected from the group consisting of benzoic acid, acetic acid, propionic acid and butyric acid and an unsaturated aldehyde selected from the group consisting of acrolein, α-methacrolein, α-ethacrolein, α-bromacrolein, crotonaldehyde, α-chlorocrotonaldehyde and cinnamic aldehyde, the diacylate constituting from 2.5 to 70 per cent by weight of the mixture, the balance of the polymerizable materials in the mixture being the compound selected from the group consisting of vinyl acetate, methyl acrylate, methyl α-methacrylate and styrene.

2. A process for preparing a resinous copolymer comprising heating, in the presence of a peroxide polymerization catalyst, a mixture of a compound selected from the group consisting of vinyl acetate, methyl acrylate, methyl α-methacrylate and styrene, with a diacylate of a monocarboxylic acid selected from the group consisting of benzoic acid, acetic acid, propionic acid and butyric acid and an unsaturated aldehyde selected from the group consisting of acrolein, α-methacrolein, α-ethacrolein, α-bromacrolein, crotonaldehyde, α-chlorocrotonaldehyde and cinnamic aldehyde, the diacylate constituting from 2.5 to 70 per cent by weight of the mixture, the balance of the polymerizable materials in the mixture being the compound selected from the group consisting of vinyl acetate, methyl acrylate, methyl α-methacrylate and styrene.

3. A process for preparing a resinous copolymer comprising heating, in the presence of an organic peroxide polymerization catalyst, a mixture of a compound selected from the group consisting of vinyl acetate, methyl acrylate, methyl α-methacrylate and styrene, with a diacylate of a monocarboxylic acid selected from the group consisting of benzoic acid, acetic acid, propionic acid and butyric acid and an unsaturated aldehyde selected from the group consisting of acrolein, α-methacrolein, α-ethacrolein, α-bromacrolein, crotonaldehyde, α-chlorocrotonaldehyde and cinnamic aldehyde, the diacylate constituting from 2.5 to 70 per cent by weight of the mixture, the balance of the polymerizable materials in the mixture being the compound selected from the group consisting of vinyl acetate, methyl acrylate, methyl α-methacrylate and styrene.

4. A process for preparing a resinous copolymer comprising heating, in the presence of an organic peroxide polymerization catalyst, a mixture of vinyl acetate with α-methacrolein diacetate, the α-methacrolein diacetate constituting from 2.5 to 70 per cent by weight of the mixture, the balance of the polymerizable material in the mixture being vinyl acetate.

5. A process for preparing a resinous copolymer comprising heating, in the presence of an organic peroxide polymerization catalyst, a mixture of styrene and α-methacrolein diacetate, the α-methacrolein diacetate constituting from 2.5 to 70 per cent by weight of the mixture, the balance of the polymerizable material in the mixture being styrene.

6. A process for preparing a resinous copolymer comprising heating, in the presence of an organic peroxide polymerization catalyst, a mixture of methyl α-methacrylate and α-methacrolein diacetate, the α-methacrolein diacetate constituting from 2.5 to 70 per cent by weight of the mixture, the balance of the polymerizable material in the mixture being methyl α-methacrylate.

7. A resinous copolymer obtained by the process of claim 1.

8. A resinous copolymer obtained by the process of claim 4.
9. A resinous copolymer obtained by the process of claim 5.
10. A resinous copolymer obtained by the process of claim 6.

LOUIS M. MINSK.
CORNELIUS C. UNRUH.

REFERENCES CITED

The following references are of record in the file of this patent:

UNITED STATES PATENTS

| Number | Name | Date |
|---|---|---|
| 2,178,523 | Schmidt | Oct. 31, 1939 |
| 2,311,781 | Scrutchfield | Feb. 23, 1943 |
| 2,312,193 | Richter | Feb. 23, 1943 |
| 2,332,896 | D'Alelio | Oct. 26, 1943 |

FOREIGN PATENTS

| Number | Country | Date |
|---|---|---|
| 517,684 | British | Feb. 6, 1940 |